US012003915B2

(12) United States Patent
Lewis et al.

(10) Patent No.: US 12,003,915 B2
(45) **Date of Patent: *Jun. 4, 2024**

(54) ACOUSTIC FILTERS FOR MICROPHONE NOISE MITIGATION AND TRANSDUCER VENTING

(71) Applicant: Sonos, Inc., Santa Barbara, CA (US)

(72) Inventors: Jerad Lewis, Cambridge, MA (US); Philippe Vossel, Wuppertal (DE); Michael Perkmann, Vienna (AT); Martin Seidl, Vienna (AT)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,726

(22) Filed: Dec. 1, 2022

(65) Prior Publication Data

US 2023/0164479 A1 May 25, 2023

Related U.S. Application Data

(63) Continuation of application No. 17/303,198, filed on May 24, 2021, now Pat. No. 11,528,551.

(Continued)

(51) Int. Cl.

*H04R 5/00* (2006.01)
*H04R 1/10* (2006.01)
*H04R 5/033* (2006.01)

(52) U.S. Cl.

CPC ......... *H04R 1/1083* (2013.01); *H04R 1/1008* (2013.01); *H04R 5/0335* (2013.01); *H04R 2460/01* (2013.01)

(58) Field of Classification Search

CPC .. H04R 1/1083; H04R 1/1008; H04R 5/0335; H04R 2460/01; H04R 1/086; H04R 2201/107; H04R 2460/11

(Continued)

(56) References Cited

U.S. PATENT DOCUMENTS 5,440,644 A 8/1995 Farinelli et al.
5,761,320 A 6/1998 Farinelli et al.

(Continued)

FOREIGN PATENT DOCUMENTS

EP 1389853 A1 2/2004
WO 200153994 7/2001

(Continued)

OTHER PUBLICATIONS

Audio Tron Quick Start Guide, Version 1.0, Mar. 2001, 24 pages.

(Continued)

*Primary Examiner* — Carolyn R Edwards
*Assistant Examiner* — Friedrich Fahnert
(74) *Attorney, Agent, or Firm* — Fortem IP LLP

(57) ABSTRACT

Playback devices such as headphone devices can include an earpiece configured to be positioned adjacent a user's ear. The earpiece can include a transducer having a diaphragm configured to face toward the user's ear when the earpiece is positioned adjacent the user's ear, as well as an outlet vent in fluid communication with the transducer and a microphone. A support member within the earpiece includes a first opening aligned with the microphone and a second opening aligned with the outlet vent. An acoustic mesh extends over the first opening and the second opening, wherein the mesh has a substantially uniform acoustic impedance.

13 Claims, 11 Drawing Sheets

Related U.S. Application Data

(60) Provisional application No. 63/033,011, filed on Jun. 1, 2020.

(58) Field of Classification Search
USPC ........................................................ 381/71.6
See application file for complete search history.

(56) References Cited

U.S. PATENT DOCUMENTS

| | | | | |
|---|---|---|---|---|
| 5,923,902 | A | 7/1999 | Inagaki | |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |
| 2013/0058493 | A1* | 3/2013 | Darlington | H04R 1/1083 381/380 |
| 2017/0223443 | A1* | 8/2017 | Silvestri | H04R 1/1016 |
| 2020/0174735 | A1* | 6/2020 | Gomes | G06F 3/165 |

FOREIGN PATENT DOCUMENTS

| | | | | |
|---|---|---|---|---|
| WO | 2003093950 | A2 | 11/2003 | |
| WO | 2019195288 | A1 | 10/2019 | |
| WO | WO-2019195288 | A1 * | 10/2019 | H04R 1/1008 |

OTHER PUBLICATIONS

Audio Tron Reference Manual, Version 3.0, May 2002, 70 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Audio Tron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jun. 9, 2022, issued in connection with U.S. Appl. No. 17/303,198, filed on May 24, 2021, 11 pages.
Notice of Allowance dated Sep. 8, 2022, issued in connection with U.S. Appl. No. 17/303,198, filed May 24, 2021, 7 pages.

* cited by examiner

ACOUSTIC FILTERS FOR MICROPHONE NOISE MITIGATION AND TRANSDUCER VENTING

CROSS-REFERENCE TO RELATED APPLICATION

The present application is a continuation of U.S. patent application Ser. No. 17/303,198, filed May 24, 2021, now U.S. Pat. No. 11,528,551, which claims priority to U.S. Patent Application No. 63/033,011, filed Jun. 1, 2020, both of which are incorporated herein by reference in their entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
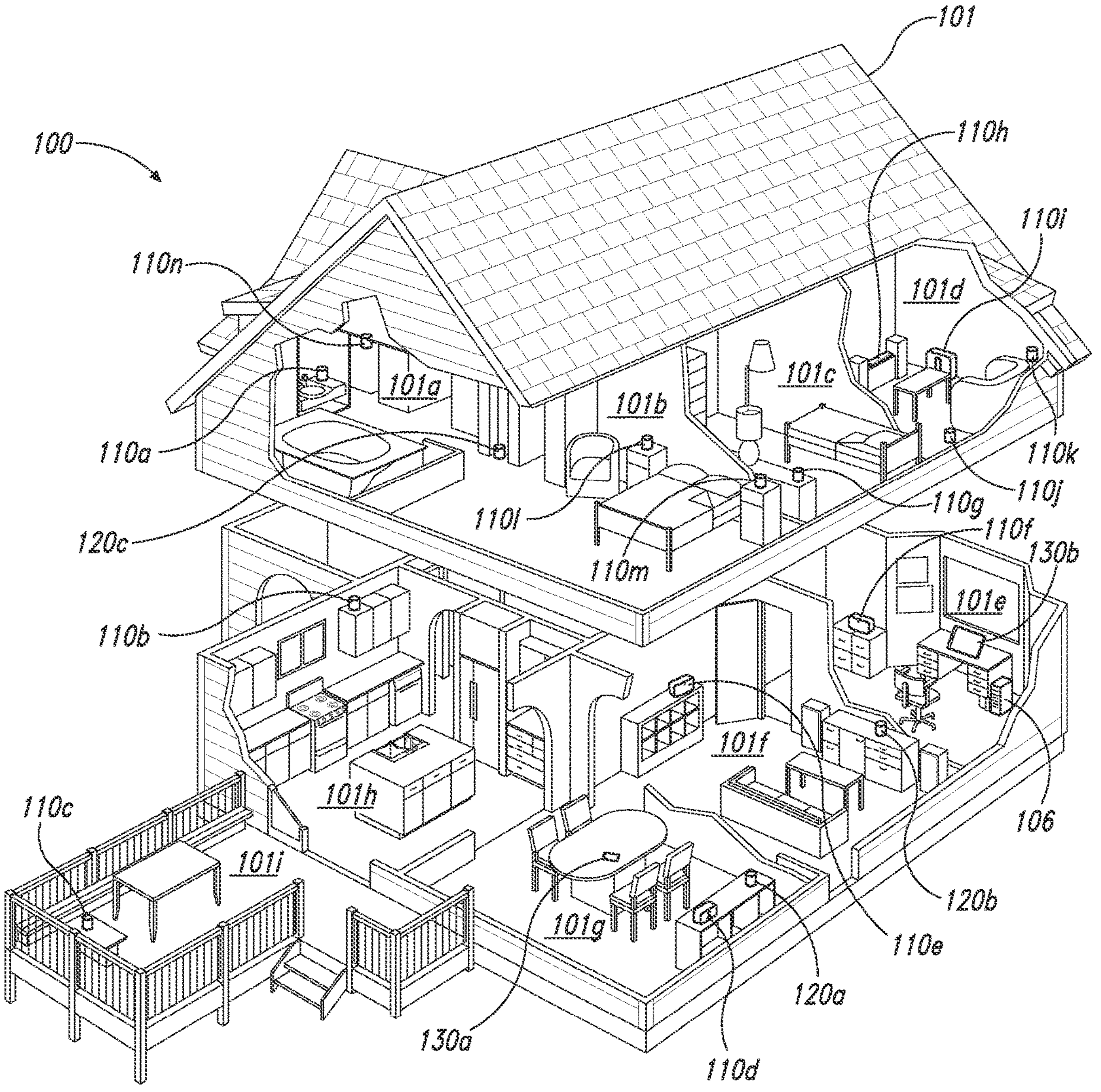
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Building upon its success in networked media players, Sonos has begun researching and developing networked headphone systems to expand upon the listening options available to Sonos users. Embodiments described herein relate to headphone devices and other playback devices with acoustic ports and microphones, either for receiving voice-input or for active noise cancellation.

A headphone device can include two earphones connected to one another via a headband or leads. Each headphone can include an earpiece that can be coupled to an ear cushion and positioned over or adjacent to a user's ear. The earpiece can include a driver plate assembly that carries an acoustic transducer, and an earpiece cover that can be disposed over an outer side of the driver plate assembly to enclose the transducer therein.

In some examples, an outlet vent in the earpiece permits air to pass from the acoustic volume of the transducer to a space outside the earpiece. This outlet vent can aid in controlling the acoustic load of the transducer, achieving a desired frequency response and improved bass response. The acoustic impedance of the outlet vent can be tuned to achieve the desired performance, for example by varying the cross-sectional dimension and length of the vent of the vent and/or by selecting an appropriate acoustic filter (e.g., an acoustic mesh or other suitable material) to be disposed within the path of the outlet vent.

A headphone can also include a microphone carried within the earpiece. For example, one or more microphones may be used for active noise cancellation and/or to receive voice input from a user. The microphones could also be used for hear-through, or enabling a user to listen to the ambient environment. In many cases, it is useful to position such microphones to detect sound from external to the headphone, either to detect a user's voice or to detect ambient sounds for noise cancellation. As such, a microphone may be positioned within or adjacent an opening of the earpiece, such that the microphone is in fluid communication with the air external to the earpiece. The performance of the microphone can be tuned in part by disposing an acoustic filter thereover. Such a filter can improve the acoustic performance of the microphone by reducing noise (e.g., wind noise), tuning the response of the microphone signal, and/or also acting as a shield to protect the microphone from dust or other contaminants.

In some examples, a single acoustic filter (e.g., a mesh or other suitable material having a particular acoustic impedance) can be used to both tune the acoustic characteristics of the transducer outlet vent and to mitigate wind noise for the microphone(s). For example, a support member disposed within the earpiece can at least partially surround the transducer. In some examples, the support member is a substantially annular ring having a plurality of openings or ports formed therein. A first opening can be substantially aligned with the outlet vent, which as noted above is in fluid communication with the acoustic volume of the transducer. A second opening can be substantially aligned with a microphone. An acoustic filter can extend over both the first and second ports, for example in the form of a contiguous strip of mesh material extending over substantially the entire circumference of the support member. By selecting the dimensions of the first and second ports as well as the impedance of the acoustic filter, the resulting assembly can provide both an appropriately tuned outlet vent for improved transducer performance and an appropriately tuned microphone filter so as to mitigate the influence of wind noise.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers typically identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for instance, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various examples of the disclosure are described in greater detail below with respect to FIGS. 1B-1H.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain examples and examples are described below in the context of a home environment, the technologies described herein may be implemented in other types of environments. In some examples, for instance, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated example of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1H.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip-hop music being played back by playback device 110*c* on the patio 101*i*. In some aspects, the playback devices 110*c* and 110*f* play back the hip-hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
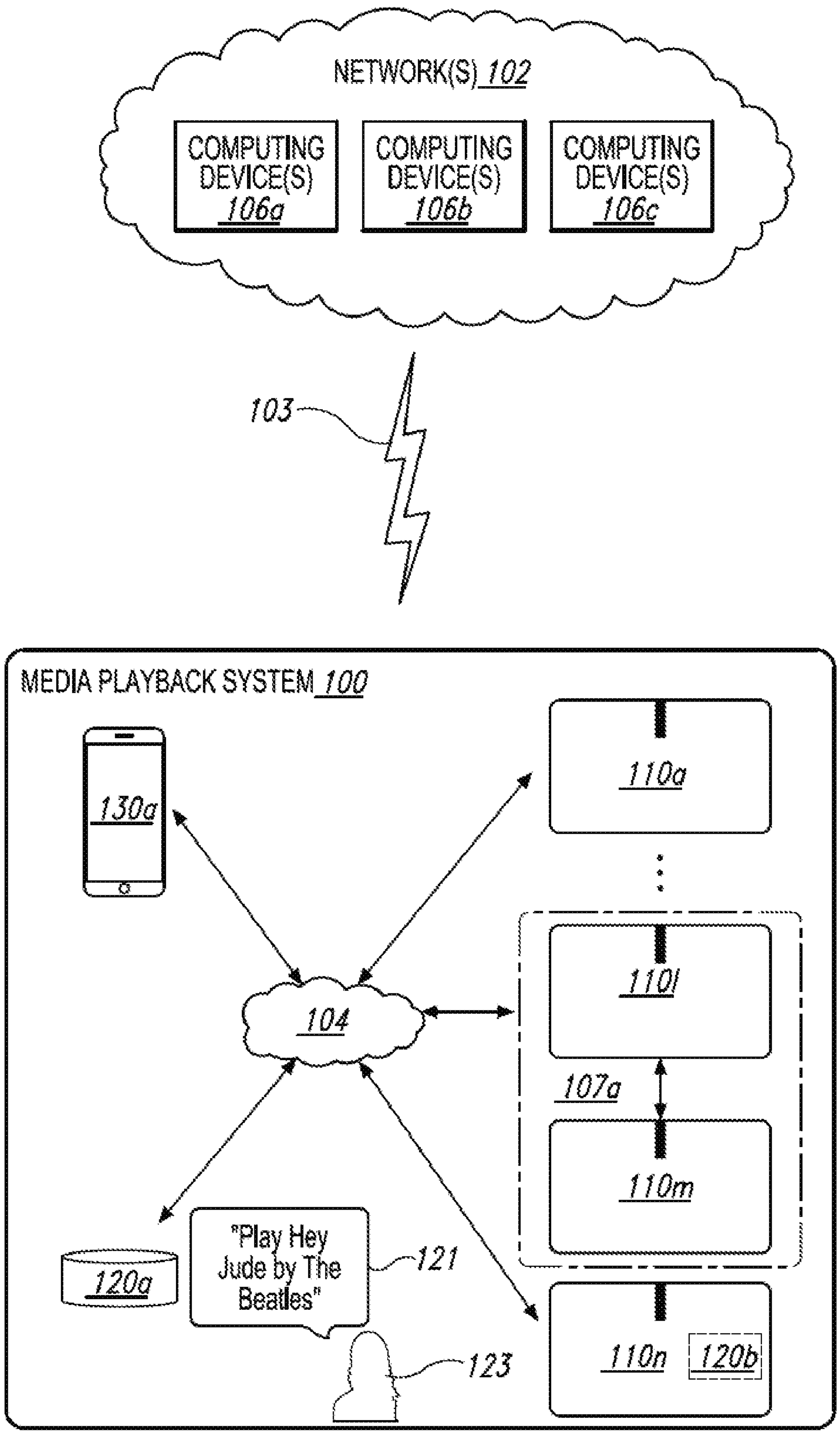
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a Wi-Fi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "Wi-Fi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household network). In some examples, the links 103 and the network 104 comprise one or more of the same networks. In some aspects, for example, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for instance, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, for instance, the media content database is stored on one or more of the playback devices 110, network microphone devices 120, and/or control devices 130.

In the illustrated example of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for instance, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated example of FIG. 1B, the NMD 120*a* is a standalone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
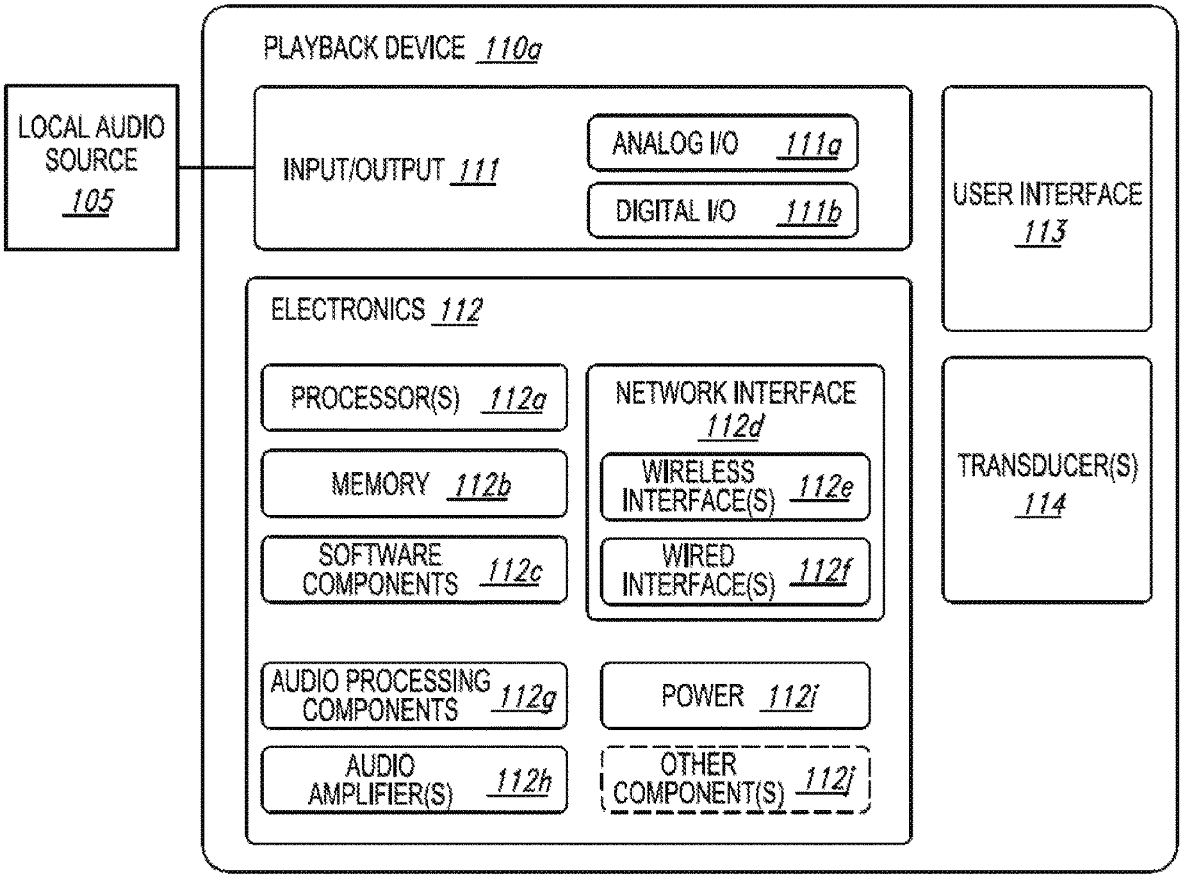
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, Bluetooth, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for instance, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some examples, the operations further include causing the playback device 110*a* to send audio data to another one of the playback devices 110*a* and/or another device (e.g., one of the NMDs 120). Certain examples include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some examples, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., Bluetooth, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, for instance, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
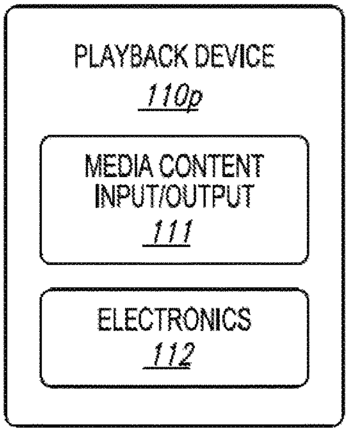
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example examples disclosed herein. Additionally, one of ordinary skilled in the art will appreciate that a playback device is not limited to the examples described herein or to SONOS product offerings. In some examples, for instance, one or more playback devices 110 comprises wired or wireless headphones (e.g., over-the-ear headphones, on-ear headphones, in-ear earphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

Figure 1E:
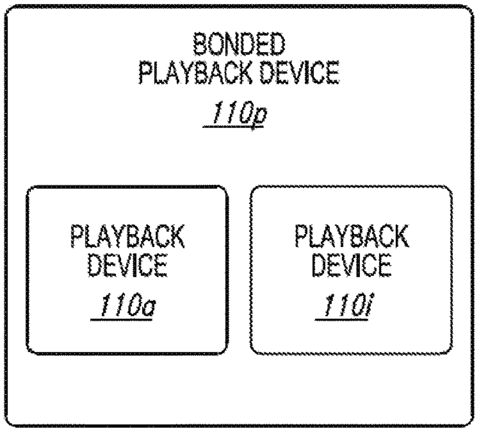
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, for instance, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device.

c. Suitable Network Microphone Devices (NMDs)

Figure 1F:
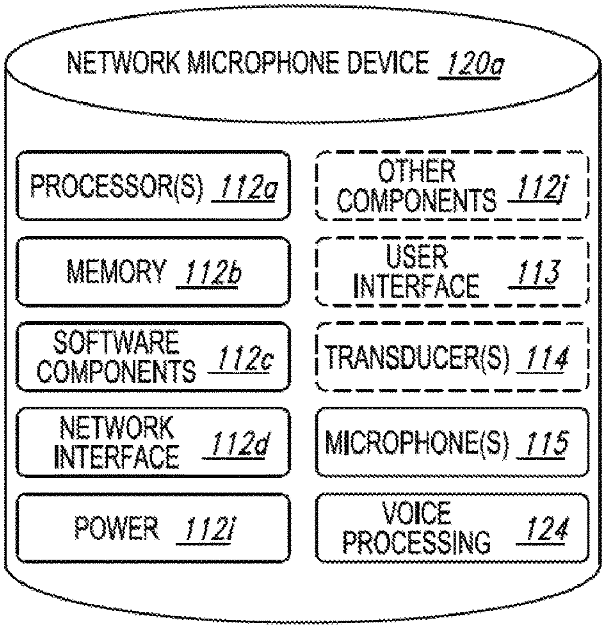
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the amplifiers 114, and/or other playback device components. In certain examples, the NMD 120*a* comprises an Internet of Things (IoT) device such as, for example, a thermostat, alarm panel, fire and/or smoke detector, etc. In some examples, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

Figure 1G:
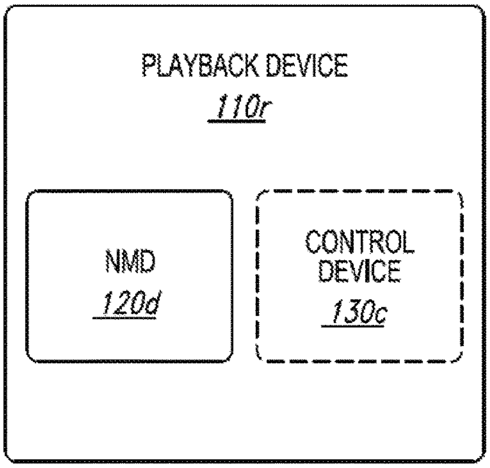
FIG. 1G is a block diagram of a playback device.

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
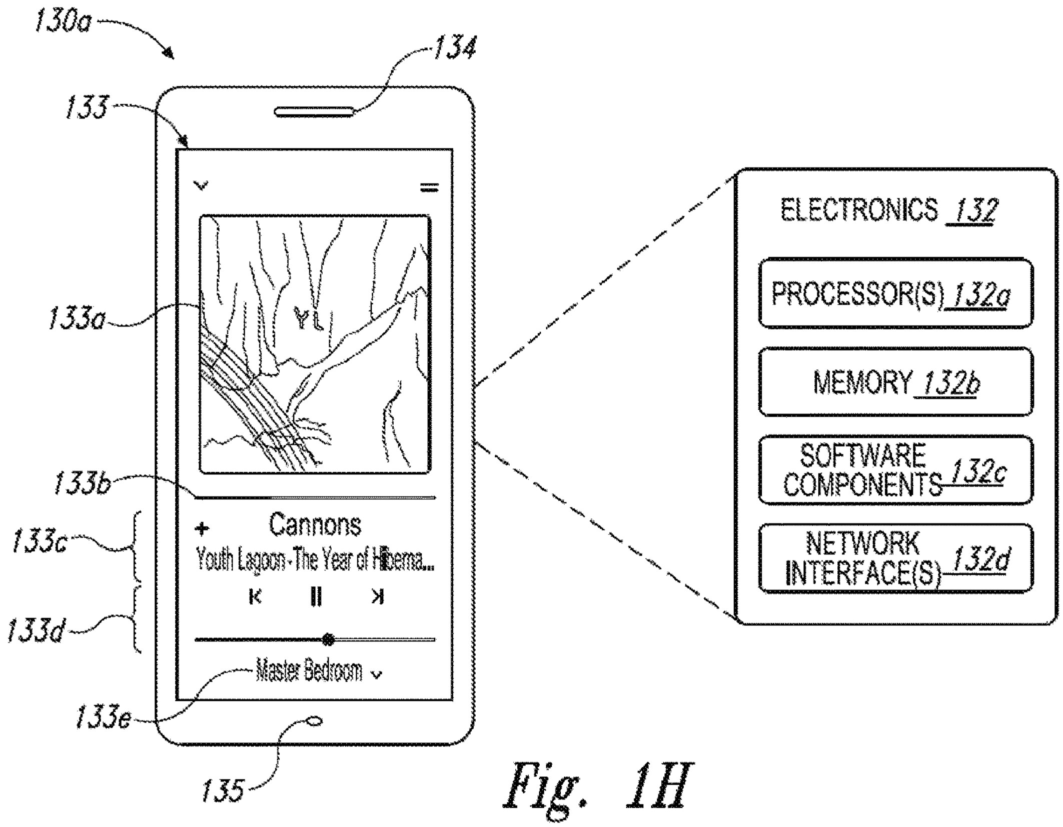
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™, an Android phone) on which media playback system controller application software is installed. In some examples, the control device 130*a* comprises, for example, a tablet (e.g., an iPad'), a computer (e.g., a laptop computer, a desktop computer), and/or another suitable device (e.g., a television, an automobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 112*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some examples, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 100. The network interface 132*d* can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated example, the user interface 133 comprises a display presented on a touch screen interface of a smartphone (e.g., an iPhone™, an Android phone). In some examples, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some examples, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some examples the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device 130*a* is configured to operate as playback device and an NMD. In other examples, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Microphone-Enabled Headphone Devices with Acoustic Filters

In some examples a playback device may be a headphone device. Aspects of the present disclosure relate to a headphone device including one or more microphones (e.g., for detecting voice input from a user and/or for performing active noise cancellation). As used herein with respect to headphone devices, "forward," "front," and "inner" refer to a direction nearer to the ear of the user when the device is worn, and "rear" and "outer" refer to an opposite direction, further from the ear of the user when the device is worn.

Figure 2:
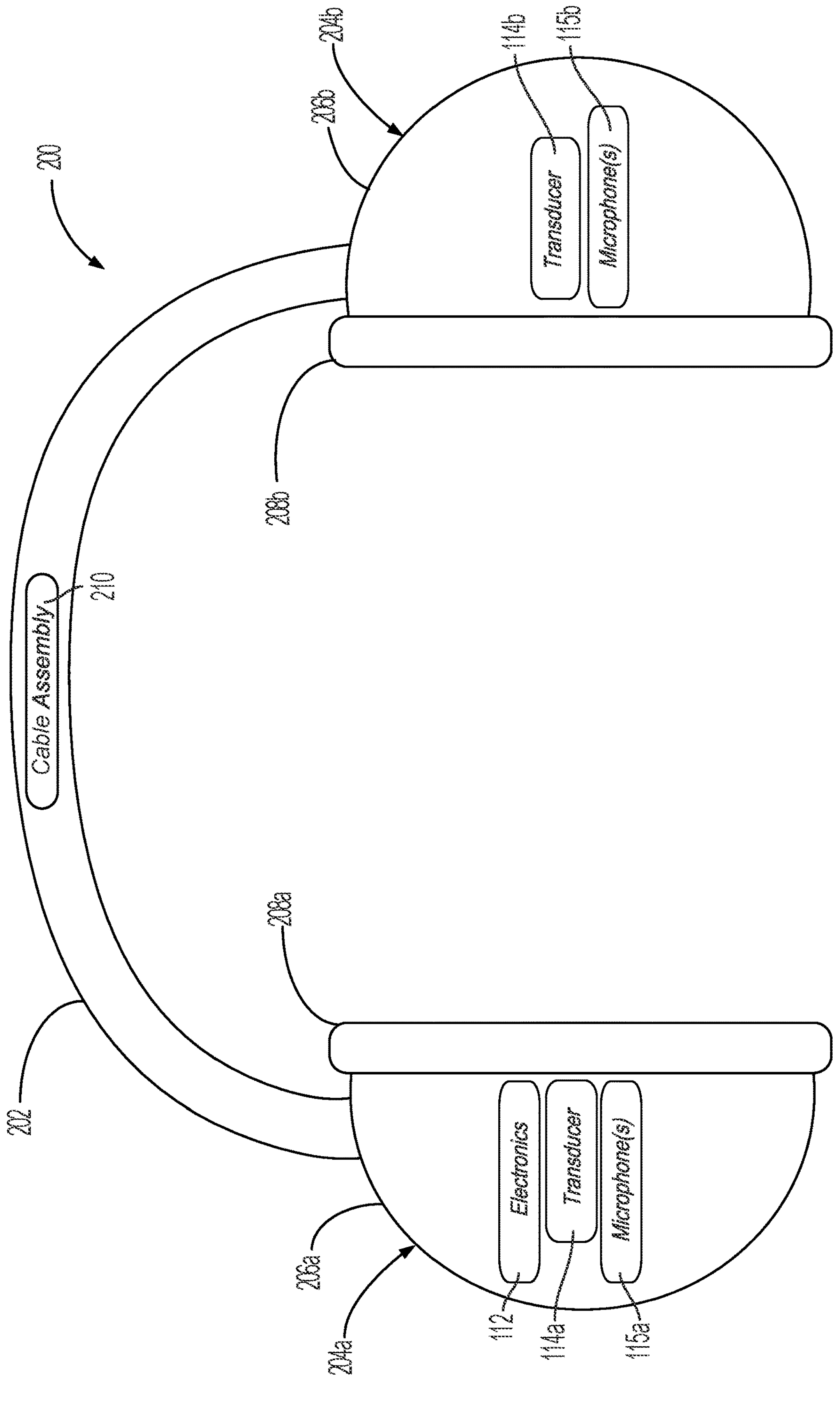
FIG. 2 is a schematic drawing of a headphone playback device, according to an example.

FIG. 2 shows some aspects of an example headphone device 200 according to some examples. The headphone device 200 may be implemented as a wearable device such as over-ear headphones, in-ear headphones, or on-ear headphones. As shown, the headphone device 200 includes a headband 202 that couples a first headphone 204*a* to a second headphone 204*b*. Each of the headphones 204*a* and 204*b* includes a respective earpiece 206*a* and 206*b*, one or both which may house a number of components therein, including transducers 114*a* and 114*b*, microphones 115*a* and 115*b*, and electronic components 112 (e.g., amplifiers, filters, processor(s) 112*a*, memory 112*b*, receivers, transmitters, switches, antennas, etc.). In some examples, the collection of above-listed components are said be enclosed within a headphone housing, which includes the combination of the first and second headphones 204*a* and 204*b* and the headband 202.

The microphones 115*a* and 115*b* may be disposed within one or both earpieces 206*a* and 206*b*. Further, when equipped with the microphones 115, headphone device 200 can operate as an NMD configured to receive voice input from a user and correspondingly perform one or more operations based on the received voice input. Additionally or alternatively, the microphones 115 may be used for active noise cancellation (ANC) and/or active noise reduction (ANR).

Although the illustrated example shows certain components housed within the first earpiece 206*a* (e.g., electronics 112), in various examples some of all of these components can be housed in the other earpiece 206*b*. In some examples, some or all of these components can be duplicated in the second earpiece 206*b*.

In the example shown in FIG. 2, the first transducer 114*a* and the first microphone 115*a* are in the first earpiece 206*a* and the second transducer 114*b* is in the second earpiece 206*b*. To connect the first transducer 114*b* in the second earpiece 206*b* with components in the first earpiece 206*a*, the headband includes a cable assembly 210 that connects circuitry disposed within the second earpiece 206*b* to circuitry disposed within the second earpiece 206*b*). The cable assembly 210 may be constructed as, for example, a set of one or more cables that couple (e.g., electrically couple) one or more components at least partially housed by the first earpiece 206*a* with one or more components at least partially housed by the second earpiece 206*b*. In examples in which a second antenna assembly is disposed in the second earpiece 206*b*, the cable assembly 210 connects the second antenna in the second earpiece 206*b* with the communication circuitry 250 in the first earpiece 206*a*.

The cable assembly 210 may be constructed as, for example, a set of one or more cables (e.g., a set of one or more flexible cables), for example a coaxial cable. Although coaxial cables are advantageous because of durability, low noise, and ease of manufacture and implementation for the example headphone configuration(s) described herein, the cable assembly 210 may comprise other types of cables in place of the coaxial cable or in combination with the coaxial cable. For instance, in some examples, the cable assembly 210 may comprise a triaxial cable, a ribbon cable, or any other cable configuration suitable for connecting circuitry in the second earpiece 206*b* with circuitry in the first earpiece 206*a*.

As shown in FIG. 2, the headphones 204*a* and 204*b* may further include ear cushions 208*a* and 208*b* that are coupled to earpieces 206*a* and 206*b*, respectively. The ear cushions 208*a* and 208*b* may provide a soft barrier between the head of a user and the earpieces 206*a* and 206*b*, respectively, to improve user comfort and/or provide acoustic isolation from the surrounding environment (e.g., passive noise reduction (PNR)).

In some examples, the electronics 112 may comprise any of a variety of electronic components that enable transmission and/or receipt of wireless signals. Examples of such components include receivers, transmitters, processors 112*a*, memory 112*b*, amplifiers, switches, and/or filters. The electronics 112 include one or more antennas configured to communicate over one or more wireless networks. Example wireless networks include: a Wi-Fi network, a Bluetooth network, an LTE network, a Z-Wave network, and a ZigBee network.

In some examples, the headphone device 200 may be configured to operate in various operational modes dependent upon media-type and/or synchronized devices (e.g., music, home theater, etc.). For example, one mode may be a synchronized playback mode where headphone device 200 plays back audio content that is synchronized with playback of content output by another device. In one example, the synchronized playback mode includes a first headphone device playing back audio that is synchronized with a television set's playback of video corresponding to the audio that the first headphone device is playing back. In some examples, the audio may be home theater or surround sound audio. In another example, the synchronized playback mode includes the first headphone device playing back audio that is synchronized with a second headphone device's playback of the same audio that the first headphone device is playing. In yet another example, the synchronized playback mode includes the first playback device playing back audio that is synchronized with both (i) a television set's playback of video corresponding to the audio that the first headphone device is playing back and (ii) a second headphone device's playback of the same audio that the first headphone device is playing. Another mode may be a non-synchronized playback mode where the first headphone device plays back audio content that is not synchronized with content output by other devices (e.g., headphone device 200 playing only audio content without synchronization to other devices).

Additionally or alternatively, operating in a synchronized playback mode, such as a home theater mode, may involve pairing the headphone device 200 with other playback devices described herein. In these examples, the headphone device 200 may, for example, be grouped in a playback zone. An example playback scheme may involve muting the other playback devices in the playback zone while the headphone device 200 is paired. For example, when the headphone device 200 is paired in a playback zone with a home theater system comprising multiple playback devices (e.g., a sound bar, a subwoofer, and a plurality of satellite speakers), the other multiple playback devices may not play back home theater audio while the headphones are paired with the playback zone and playing back the home theater audio. In operation, the other multiple playback devices may mute their playback of the home theater audio, or alternatively, a home theater controller (e.g., a soundbar, surround sound processor, or other device configured to coordinate surround sound playback of the home theater audio among the multiple playback devices) may simply not transmit or otherwise provide the home theater audio information to the multiple playback devices for playback while the headphone is paired in the playback zone and configured to playback the home theater audio. In some examples, the surround sound controller transmits or otherwise provides the home theater audio to the headphones and coordinates the headphone's synchronized playback of the home theater audio with the play back of the home theater audio's corresponding video by the television or other display screen.

Further, in some examples, multiple headphone devices 200 may be paired in the playback zone. In these examples, a playback scheme may involve outputting audio content only on the paired headphone devices 200 and muting the remaining playback devices in the playback zone. For example, when a first headphone device and a second headphone device are both paired in the playback zone with the home theater system comprising the multiple playback devices (e.g., the sound bar, subwoofer, and plurality of satellite speakers), the other multiple playback devices may not play back the home theater audio while the first and second headphones are paired with the playback zone and playing back the home theater audio. As described above, the other multiple playback devices may mute their playback of the home theater audio, or alternatively, the home theater controller may simply not transmit or otherwise provide the home theater audio information to the multiple playback devices for playback while the first and second headphones are paired in the playback zone and configured to playback the home theater audio. In some examples where multiple headphones are paired with the playback zone, the surround sound controller transmits or otherwise provides the home theater audio to the first and second headphones and coordinates the synchronized playback of the home theater audio by the first and second headphones with each other and with the play back of the home theater audio's corresponding video by the television or other display screen.

Figure 3B:
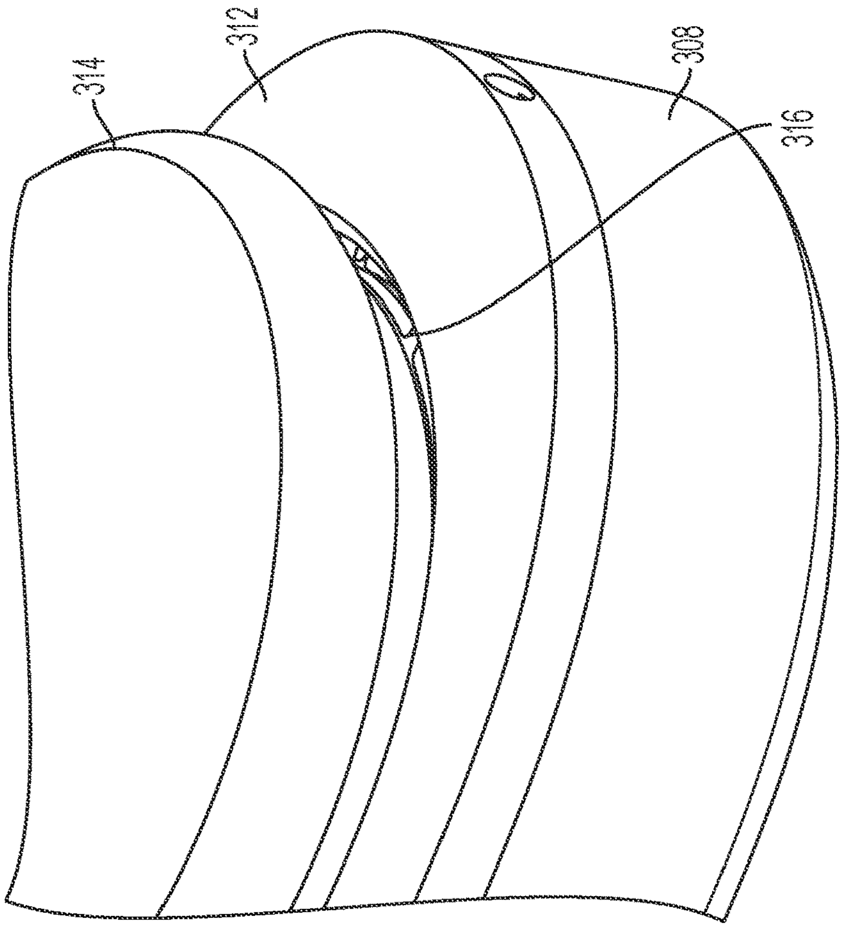
FIG. 3B is a perspective view of the headphone shown in FIG. 3A.
Figure 3A:
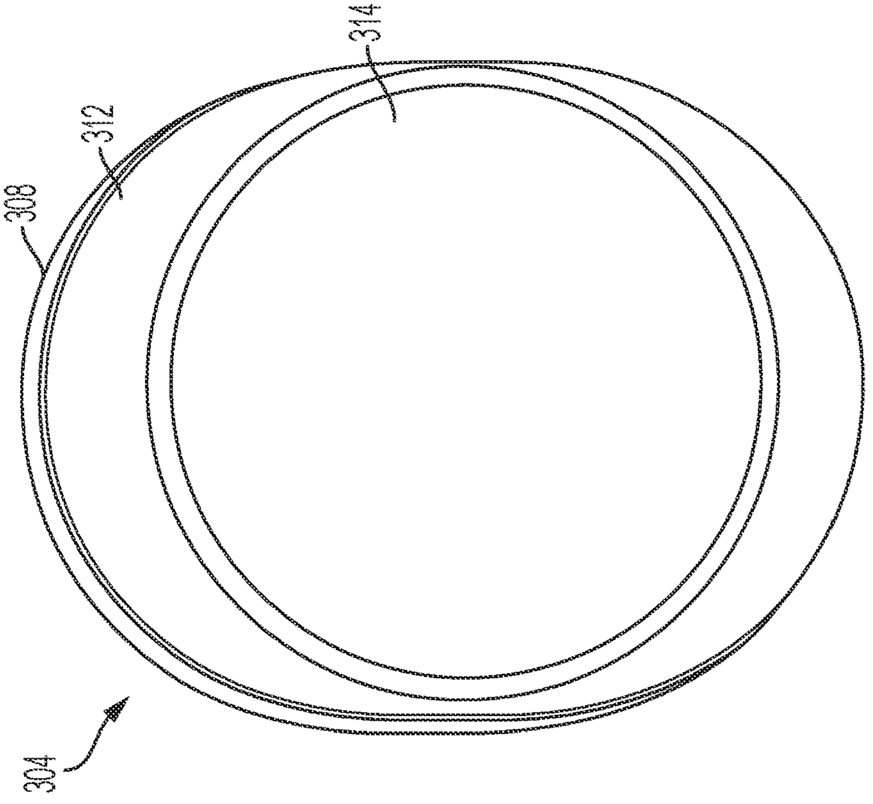
FIG. 3A is a side view of a headphone of a playback device in accordance with some examples of the disclosed technology.

FIGS. 3A-3E show different views of a headphone 304 for a headphone device (e.g., a headphone device including two headphones connected by a headband or leads). The headphone 304 can be similar to the headphones 204 described above with respect to FIG. 2. As best seen in FIGS. 3A and 3B, the headphone 304 includes an ear cushion 308 configured to face towards a user's head (e.g., against and/or around a user's ear, depending on the desired configuration). The ear cushion 308 can be a soft, flexible material configured to comfortably conform to the user's head or ear to improve acoustic performance of the device and to provide passive noise reduction. A rear housing 312 extends over the ear cushion 308, with a rear cover 314 disposed over the housing 312. As shown in FIG. 3B, a gap 316 is disposed between the rear cover 314 and the housing 312. As described in more detail below, one or more ports or openings can be disposed in the gap 316 to facilitate communication between interior components (e.g., a transducer outlet vent, microphone(s), etc.) and the surrounding environment. In some examples, the rear cover 314 can include a touch-sensitive input with associated control electronics such that a user can control operation of the headphone device by interacting with a touch-sensitive portion of the rear cover 314. In some examples, a user may swipe, tap, pinch, or perform other gestures to interact with a touch-sensitive portion of the rear cover 314.

Figure 3C:
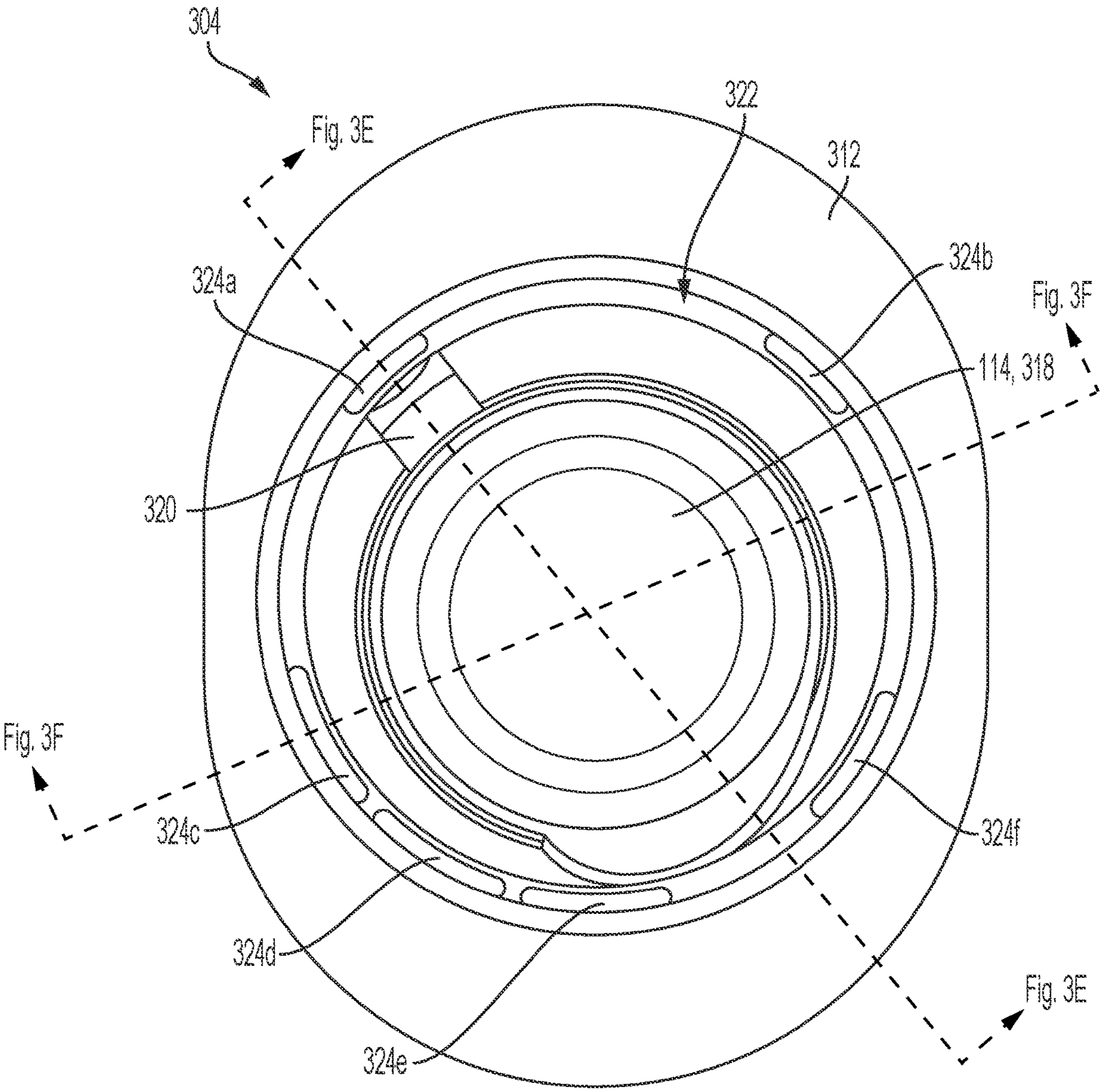
FIG. 3C is a side view of the headphone shown in FIG. 3A, with the outer cover removed.

FIG. 3C illustrates the headphone 304 with the rear cover 314 removed. As illustrated, the housing 312 circumferentially surrounds the transducer 114, which is covered by a rear driver plate 318 disposed substantially centrally with respect to the opening in the housing 312. A support member 322 is coupled to the housing 312 and disposed at least partially radially inwardly therefrom. The support member 322 can be a plate or other suitable structure that facilitates engagement with the rear cover 314 via an intervening connector (e.g., gasket 338, FIGS. 3E-3G). The support member 322 includes a plurality of individual openings 324*a-f* (together "openings 324") disposed around the support member 322. When the rear cover 314 is engaged with the support member 322, the interior chamber (or at least a portion thereof) of the headphone 304 can be substantially sealed except for the openings 324.

Figure 3D:
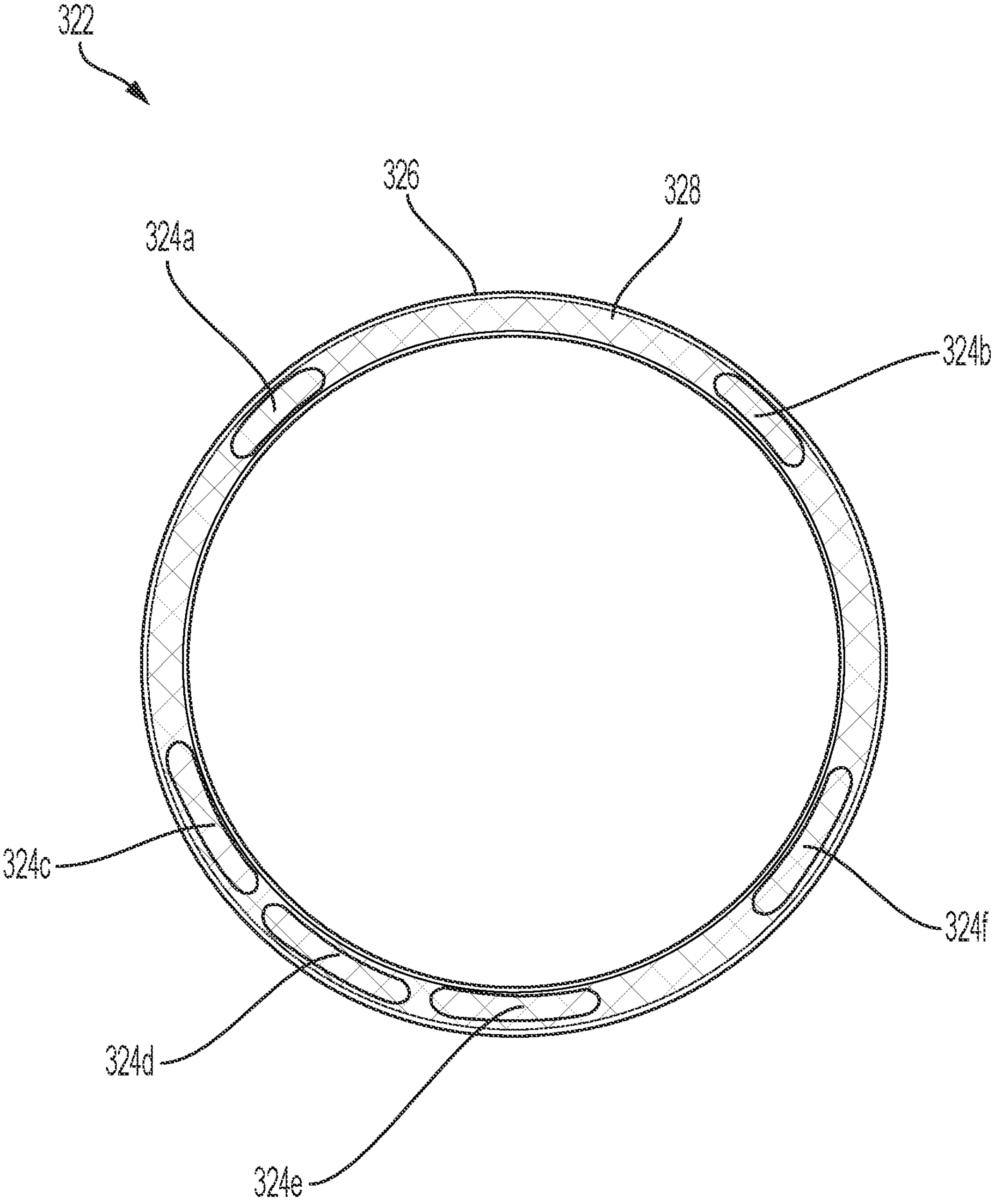
FIG. 3D is an isolated side view of a support member of the headphone device shown in FIG. 3C.

An isolated view of the support member 322 is shown in FIG. 3D. In the illustrated example, the support member 322 includes a substantially annular body 326 having a plurality of openings 324 (e.g., voids, apertures, windows, ports, etc.) formed therein. The body 326 can be made of any suitable material, for example, a rigid or flexible polymer, metal, etc. In the illustrated example, the body 326 is substantially annular, having a ring-like structure defining a circular opening. In other examples, the body 326 can assume other shapes, for example defining a circular opening but having a non-circular outer border, or defining a non-circular opening. According to some examples, the body 326 of the support member 322 is semi-annular, extending only partially around a circumference of the transducer 114 and/or the rear driver plate 318. In some examples, the body 326 can be formed continuously with the rear cover 314 rather than as a discrete member coupled thereto. In various examples, the body 326 of the support member 322 can assume any suitable shape while providing one or more openings 324 configured to provide an acoustic path between interior components of the headphone 304 and the surrounding environment.

An acoustic filter 328 extends over the body 326, including over the openings 324. In the illustrated example, the acoustic filter 328 extends substantially over the entire surface of one side of the body 326 of the support member 322. In other examples, the acoustic filter 328 extends only partially over the surface of the body 326, for example extending only over some of the openings 324. In some examples, the acoustic filter 328 is disposed over the openings but does not extend over at least some portions of the body 326. The acoustic filter 328 can be coupled to the body 326 using any suitable technique, for example adhesives, clamps, fasteners, etc. In some examples, the acoustic filter 328 comprises a contiguous strip of mesh or other filter material. According to some examples, a plurality of discrete acoustic filters 328 can be disposed over different portions or segments of the support member 322.

In addition to reducing the number of component parts and simplifying the design, using a single acoustic filter 328 can improve the appearance of the headphone 304. Because the support member 322 may be at least partially visible through the gap 316 of the headphone device 304, the use of a single acoustic filter 328 can provide a uniform appearance around the circumference of the support member 322, thereby enhancing the design and aesthetic appeal of the assembled headphone 304.

The acoustic filter 328 can be any suitable material providing acoustic impedance. For example, the acoustic filter 328 can be a mesh, foam, film, woven or non-woven material, microperforations formed in the support member 322, or any other suitable acoustic filter. Based on the material properties, the acoustic filter 328 can provide a desired acoustic impedance. In various examples, the acoustic filter 328 can have an acoustic impedance that is substantially uniform across its dimensions, while in other examples the impedance of the acoustic filter 328 can vary from one region to the next. In some examples, the acoustic impedance of the acoustic filter can be between about 30-150 $Rayls_{MKS}$, about 40-140 $Rayls_{MKS}$, about 50-130 $Rayls_{MKS}$, about 60-120 $Rayls_{MKS}$, about 70-110 $Rayls_{MKS}$, or about 80-100 $Rayls_{MKS}$. In some examples, the acoustic impedance of the acoustic filter 328 is less than about 150 $Rayls_{MKS}$, about 140 $Rayls_{MKS}$, about 130 $Rayls_{MKS}$, about 120 $Rayls_{MKS}$, about 110 $Rayls_{MKS}$, about 100 $Rayls_{MKS}$, about 90 $Rayls_{MKS}$, about 80 $Rayls_{MKS}$, about 70 $Rayls_{MKS}$, about 60 $Rayls_{MKS}$, about 50 $Rayls_{MKS}$, or about 40 $Rayls_{MKS}$. In some examples, the acoustic filter 328 can have an acoustic impedance that is greater than about 30 $Rayls_{MKS}$, about 40 $Rayls_{MKS}$, about 50 $Rayls_{MKS}$, about 60 $Rayls_{MKS}$, about 70 $Rayls_{MKS}$, about 80 $Rayls_{MKS}$, about 90 $Rayls_{MKS}$, about 100 $Rayls_{MKS}$, about 110 $Rayls_{MKS}$, about 120 $Rayls_{MKS}$, about 130 $Rayls_{MKS}$, or about 140 $Rayls_{MKS}$. In some examples, the acoustic filter 328 has an acoustic impedance of about 30 $Rayls_{MKS}$, about 40 $Rayls_{MKS}$, about 50 $Rayls_{MKS}$, about 60 $Rayls_{MKS}$, about 70 $Rayls_{MKS}$, about 80 $Rayls_{MKS}$, about 90 $Rayls_{MKS}$, about 100 $Rayls_{MKS}$, about 110 $Rayls_{MKS}$, about 120 $Rayls_{MKS}$, about 130 $Rayls_{MKS}$, about 140 $Rayls_{MKS}$, or about 150 $Rayls_{MKS}$.

The various openings 324 can be configured to overlie or be aligned with certain functional components of the headphone 304 to facilitate fluid communication between the components and the exterior environment. For example, the first opening 324*a* can be positioned over, aligned with, or otherwise in fluid communication with the end of an outlet vent 320 (FIG. 3C) that extends radially outwardly away from the rear driver plate 318. Specifically, the vent 320 is coupled at a first end to the rear driver plate 318 and at the second end to an opening that underlies a support member 322. In operation, the outlet vent 320 can define a duct or other conduit that allows for fluid communication between an acoustic chamber (e.g., enclosed within the rear driver plate 318) and the exterior environment. During audio playback, air pressure created by movement of the transducer 114 can be vented through the outlet vent 320 and the first opening 324*a* in the support member 322 to the external environment. Such venting can improve operation of the transducer 114, for example by achieving a desired acoustic response, improving bass response, etc.

The total acoustic impedance presented to the transducer 114 is influenced by the combination of the particular dimensions of the outlet vent 320 and the opening 324*a*, as well as the properties of overlying acoustic filter 328. By controlling these dimensions and properties, particularly the size of the opening 324*a* and the impedance of the acoustic filter 328, the desired overall impedance can be achieved. For a particular acoustic filter 328, providing a larger size of opening 324*a* will lower the overall acoustic impedance, and conversely providing a smaller size of the opening 324*a* will increase the overall acoustic impedance.

In some examples, the first opening 324*a* can have a width of approximately 2 mm, and a length (e.g., measured along a circumferential axis) of approximately 10 mm. In some examples, the area defined by the opening 324*a* can be between about 10-30 $mm^2$, about 15-25 $mm^2$, or about 18-22 $mm^2$.

In the illustrated example, the first and second openings 324*a* and 324*b* can be substantially symmetrical about a vertical axis of the support member 322. In this configuration, the same configuration of a support member 322 can be used in both sides of a headphone device. For example, in a left-ear headphone 304, the first opening 324*a* can overlie the outlet port 320 such that the outlet vents behind a user's ear when wearing the device. When the same design is incorporated into a right-ear headphone, the second opening 324*b* can overlie an outlet port such that the outlet vents behind a user's right ear when wearing the device. In some examples, one of the openings may not be in use (e.g., not in fluid communication with an outlet port). In other examples, the support member 322 can be configured only for use on a particular side, and accordingly any non-used openings may be omitted.

In addition to the outlet vent openings 324*a* and 324*b*, the support member 322 includes a plurality of openings 324*c-f* that can be configured to overlie, be aligned with, or otherwise be in fluid communication with one or more microphones. In the illustrated example, the microphone openings 34*a-f* are disposed along a lower portion of the support member 322, as microphones intended for receiving voice input are often positioned on a lower aspect of the headphone 304 to be oriented nearer the user's mouth.

In operation, one or more of the openings 324*c-f* can be aligned with a microphone carried within the headphone 304. Such microphone(s) can be utilized for detecting voice input from a user, for performing active noise cancellation, or for any other purpose. In one example, an active noise cancellation microphone can be positioned underneath the opening 324*c*. In the illustrated example, the openings 324*c* and 324*f* can be substantially symmetrical about a vertical axis of the support member 322. In this configuration, the same configuration of a support member 322 can be used in both sides of a headphone device. For example, in a left-ear headphone 304, the opening 324*c* can be aligned with a noise-cancellation microphone, while when the same design is incorporated into a right-ear headphone, the opening 324*f* can be aligned with a noise-cancellation microphone. In some examples, one of the openings may not be in use (e.g., not overlying a microphone). In other examples, the support member 322 can be configured only for use on a particular side, and accordingly any non-used openings may be omitted.

In some examples, the remaining two openings 324*d* and 324*e* can each overlie, be aligned with, or otherwise be in fluid communication with a corresponding microphone. These two microphones can together be used for detecting voice input from a user. By using two microphones spaced apart from one another, beamforming and other techniques can be used to improve voice detection. In some examples, the voice-input microphones can be aligned along an axis that extends from the headphone 304 generally towards a user's mouth when the headphone 304 is worn by the user. In some examples, voice input microphone(s) are included only on one headphone of a headphone device (e.g., only on the left headphone 304). As such, if a similarly configured support member 322 is used in a corresponding headphone that does not include voice input microphones, the openings 324*d* and 324*e* may be dummy openings (e.g., not disposed over any microphones).

In some examples, the openings 324*c-f* configured to correspond to microphone(s) can be generally larger than the vent openings 324*a-b*. For example, the openings 324*c-f* can have a width of approximately 2 mm and a length (measured along a circumferential axis) of approximately 15 mm. In some examples, each opening 324*c-f* can define an opening size of between about 15-45 $mm^2$, about 20-40 $mm^2$, or about 25-35 $mm^2$.

In some examples, the openings 324*a*, 324*b* configured to correspond to an outlet vent may be relatively larger than would conventionally be used for such outlet ports. This is because the acoustic filter 328 that is used for mitigation of wind noise in microphones generally has a higher acoustic impedance than would be used for transducer outlet vents. Because a single acoustic filter 328 can be used for both transducer outlet ports (e.g., openings 324*a-b*) and for microphone ports (e.g., openings 324*c-f*), the opening sizes of the transducer outlet ports may be enlarged relative to conventional designs so as to achieve the desired net acoustic impedance for the particular transducer 114. For instance, in some examples, any one of the openings 324*a-b* configured to correspond to a transducer outlet vent 320 can be at least 40%, at least 50%, at least 60%, at least 70% of the size of any one of the openings 324*c-f* configured to correspond to a microphone.

Although the illustrated example includes one noise-cancellation microphone and two voice-input microphones, in various examples the particular selection and arrangement of microphones may vary. For example, there may be none, fewer, or more microphones of each type, and the particular dimensions of the openings aligned with or corresponding to such microphones can vary to achieve the desired results. Additionally, the particular positioning and arrangement of the openings 324 around the body 326 of the support member 322 can vary. For instance, in some examples the microphone openings 324*c-f* are disposed in a lower half of the body 326, while in other examples one or more of the microphone openings 324*c-f* can be disposed in an upper half of the body 326.

Figure 3E:
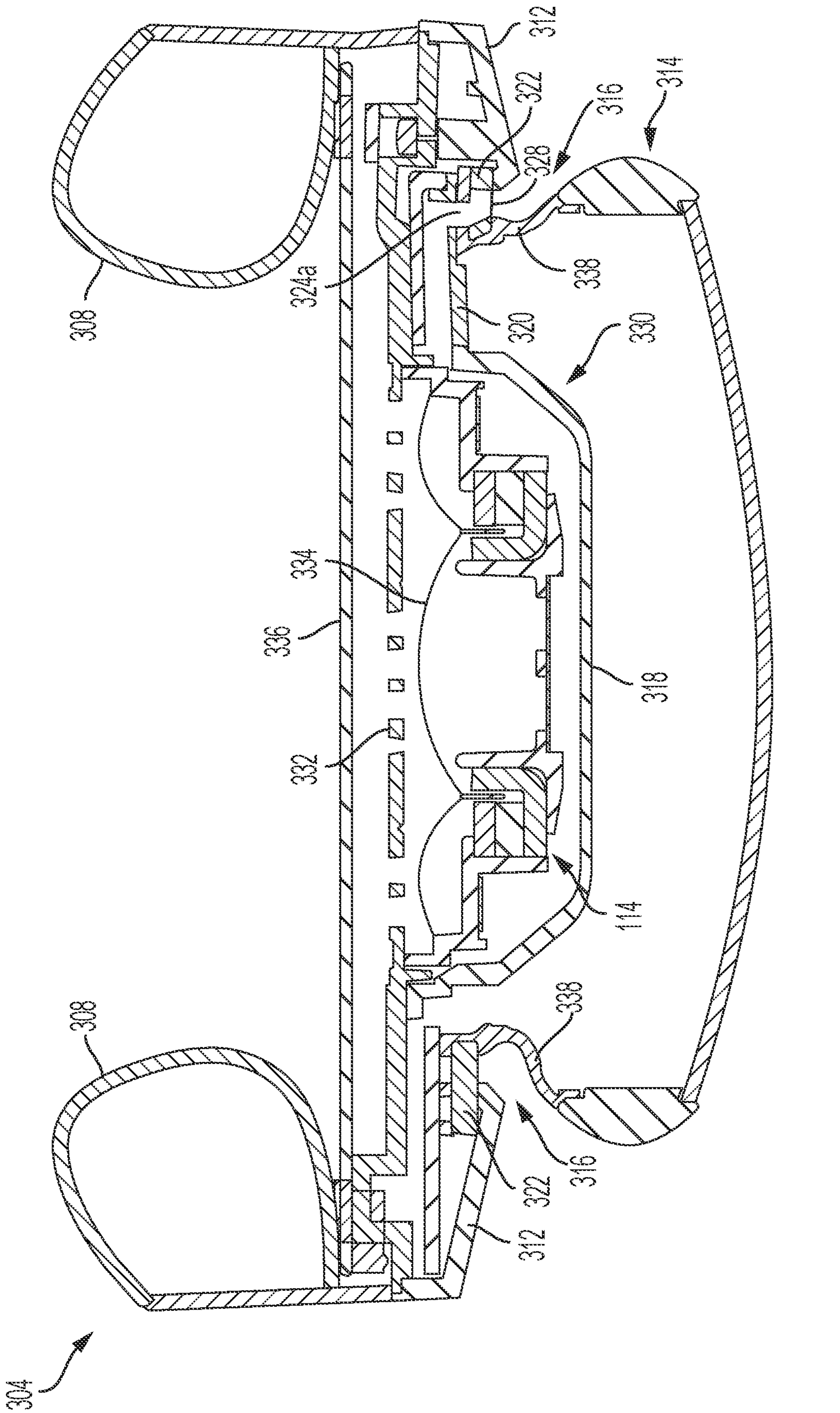
FIG. 3E is a cross-sectional side view of the headphone device taken along line 3E-3E in FIG. 3C.

FIG. 3E shows a cross-sectional view taken along line 3E-3E in FIG. 3C. As shown in cross-section, the headphone 304 includes a driver assembly 330, which includes the rear driver plate 318, a forward driver plate 332, and the transducer 114 disposed between the rear driver plate 318 and the forward driver plate 332. The driver assembly 330 can define an acoustic volume of the transducer 114. The transducer 114 includes a diaphragm 334 configured to move in response to an input signal to generate audio output directed towards the user's ears when the headphone 304 is worn by the user. A screen 336 can extend across the opening defined by the ear cushions 308 to prevent dust or debris from contacting the driver assembly 330 or other interior components of the headphone 304.

A gasket 338 couples the rear cover 314 and the housing 312. The gasket 338 can be made of a flexible material annularly surrounding the driver assembly 330 and configured to removably engage with the rear cover 314 (e.g., via snap-fit or other suitable connection).

As seen in FIG. 3E, the outlet vent 320 extends between the acoustic volume of the driver assembly 330 and the opening 324*a* in the support member 322. The acoustic filter 328 extends over the opening 324*a* in the support member 322. In operation, air vented through the outlet vent 320 passes through the opening 324*a* and through the overlying acoustic filter 328 and out through the gap 316. As noted previously, the total acoustic impedance of the vent can be tuned by selecting the dimensions of the opening 324*a* and the parameters (e.g., acoustic impedance) of the acoustic filter 328.

Figure 3F:
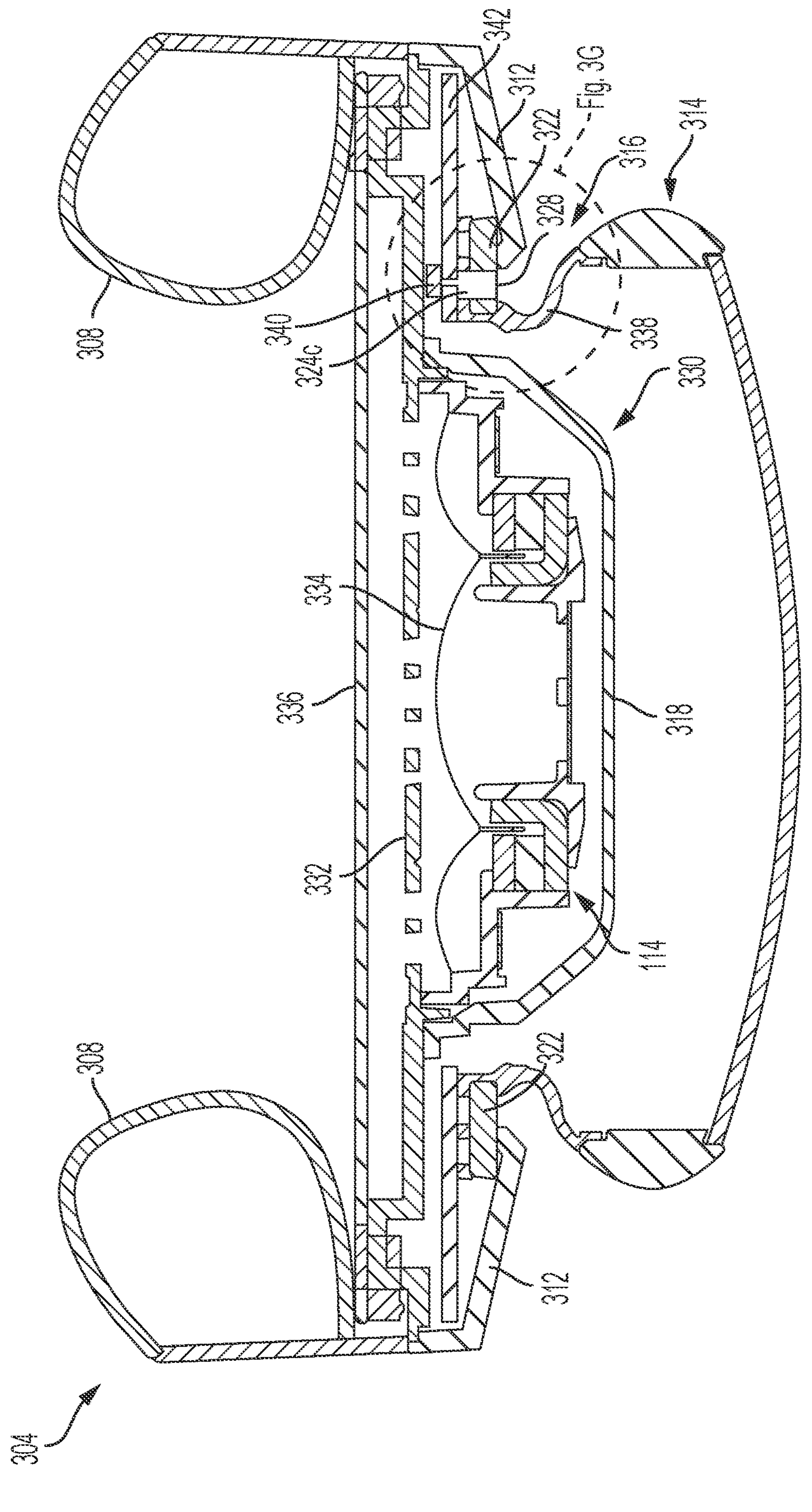
FIG. 3F is a cross-sectional side view of the headphone device taken along line 3F-3F in FIG. 3C.
Figure 3G:
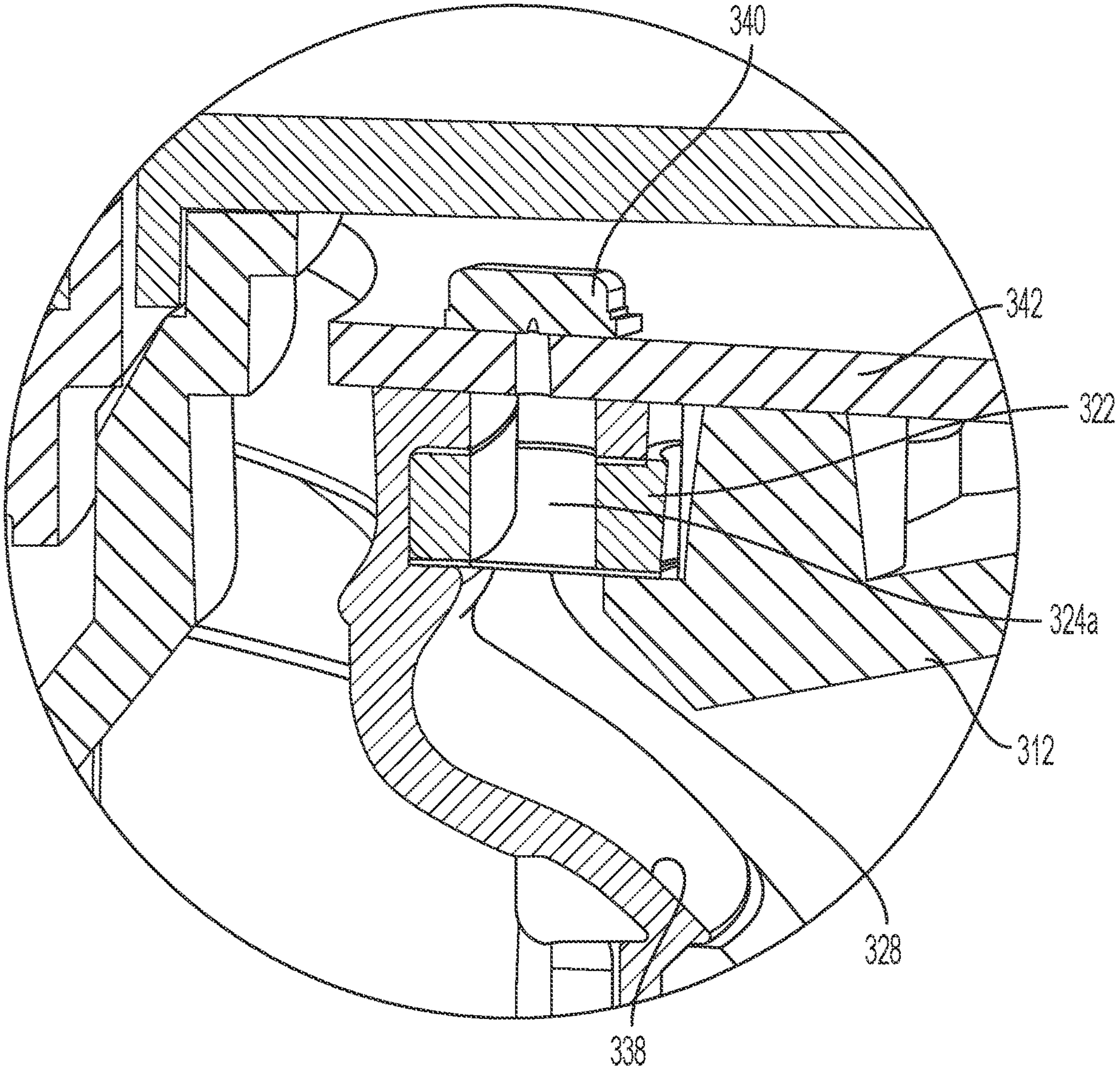
FIG. 3G is an enlarged perspective cross-sectional view of a portion of the headphone device shown in FIG. 3F.

FIG. 3F shows a cross-sectional view taken along line 3F-3F in FIG. 3C, and FIG. 3G shows an enlarged detail view of the area indicated in FIG. 3F. With reference to FIGS. 3F and 3G together, the headphone 304 includes a microphone 340 disposed over a mounting plate 342 (e.g., a printed circuit board or other suitable support). The mounting plate 342 can include an internal aperture aligned with the microphone 340, which can also be aligned with the opening 324*c* in the support member 322. In operation, the microphone 340 can be exposed to the surrounding environment (e.g., air in or around the gap 316) via the opening 324*c* and the overlying acoustic filter 328. In operation, voice input or ambient noise detected by the microphone is received through the acoustic filter 328 and the opening 324*c*. In some examples, the presence of the acoustic filter 328 can mitigate noise from wind and other external interference.

In some examples, an additional ingress filter can be disposed between the microphone 340 and the acoustic filter 328. For example, a foam, mesh, or other material can be used to prevent any dust or debris from contacting the microphone 340. In some examples, the ingress filter can be disposed within the opening 324*c* and/or over a side of the mounting plate 342 opposite the microphone 340. According to some examples, the ingress filter also contributes at least some acoustic impedance, and as such the total acoustic impedance experienced by the microphone 340 can be affected by the ingress filter (if present), the acoustic filter 328, and the dimensions of the opening 324*c*.

FIGS. 3F and 3G illustrate one example microphone 340 aligned with an opening 324*c*. A similar arrangement can be used with respect to one or more additional microphones which may be aligned with other openings (e.g., openings 324*d-f*). In various examples, the number of microphones present within the headphone 304 may vary, for example one, two, three, four, five, six, or more microphones. In some examples, some or all of the microphones are positioned so as to be aligned with a corresponding opening 324 of the support member, with the acoustic mesh 328 extending thereover. According to some examples, at least some of the microphones do not have a corresponding opening 324, or have a corresponding opening 324 but the opening does not include the acoustic filter 328 thereover.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

It should be appreciated that the acoustic filters, vent ports, and microphone ports described herein may be readily applied to devices separate and apart from portable playback devices and/or headphone devices.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to “embodiment” or “example” means that a particular feature, structure, or characteristic described in connection with the embodiment can be included in at least one example or embodiment of an invention. The appearances of this phrase in various places in the specification are not necessarily all referring to the same embodiment, nor are separate or alternative embodiments mutually exclusive of other embodiments or examples. As such, the embodiments described herein, explicitly and implicitly understood by one skilled in the art, can be combined with other embodiments or examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring aspects of the examples. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated, for example, according to various examples described below. Various examples of the disclosed technology are described as numbered examples (1, 2, 3, etc.) for convenience. These are provided as examples and do not limit the disclosed technology. It is noted that any of the dependent examples may be combined in any combination, and placed into a respective independent example. The other examples can be presented in a similar manner.

Example 1: A playback device comprising: an earpiece configured to be positioned adjacent a user’s ear, the earpiece comprising: a transducer having a diaphragm configured to face toward the user’s ear when the earpiece is positioned adjacent the user’s ear; an outlet vent in fluid communication with the transducer; a microphone; a support member having a first opening aligned with the microphone and a second opening aligned with the outlet vent; and an acoustic mesh extending over the first opening and the second opening, wherein the mesh has a substantially uniform acoustic impedance.

Example 2: The device of Example 1, wherein an area of the second opening is at least 50% greater than an area of the first opening.

Example 3: The device of any one of the preceding Examples, wherein the support member comprises a first annular member surrounding the transducer, and wherein the mesh comprises a second annular member positioned over the first annular member.

Example 4: The device of any one of the preceding Examples, wherein the first and second openings have corresponding first and second areas, wherein the microphone has a desired upstream acoustic impedance based on the first area and an acoustic impedance of the mesh, and wherein the transducer has a desired downstream acoustic impedance based on the second area and the acoustic impedance of the mesh.

Example 5: The device of any one of the preceding Examples, wherein the mesh has an acoustic impedance of between about 30-150 $\text{Rayls}_{MKS}$.

Example 6: The device of any one of the preceding Examples, wherein the mesh is exposed over an outer surface of the device.

Example 7: The device of any one of the preceding Examples, further comprising an ingress filter disposed between the microphone and the mesh.

Example 8: The device of any one of the preceding Examples, wherein the ingress filter comprises a foam material.

Example 9: The device of any one of the preceding Examples, further comprising a third port in the support member aligned with a second microphone, wherein the mesh extends over the third port.

Example 10: The device of any one of the preceding Examples, wherein the microphone is configured to detect voice input from the user.

Example 11: An earpiece assembly for a playback device, the assembly comprising: an audio transducer including a diaphragm facing in a forward direction; a housing containing the audio transducer, the housing defining an acoustic volume; an aperture in fluid communication with the acoustic volume; a microphone; a support member at least partially surrounding the audio transducer, the support member comprising a first port substantially aligned with the microphone and a second port disposed substantially aligned with the aperture; and an acoustic filter material covering the first port and the second port.

Example 12: The assembly of any one of the preceding Examples, wherein the first port has an opening size that is less than twice an opening size of the second port.

Example 13: The assembly of any one of the preceding Examples, wherein the acoustic filter material comprises an acoustic mesh.

Example 14: The assembly of any one of the preceding Examples, wherein the acoustic filter material has a substantially uniform acoustic impedance.

Example 15: The assembly of any one of the preceding Examples, wherein the mesh has an acoustic impedance of between about 30-150 $\text{Rayls}_{MKS}$.

Example 16: A portable playback device comprising: a speaker having a diaphragm configured to face toward a first direction; an enclosure defining an acoustic volume disposed behind the diaphragm along a second direction opposite the first direction; a vent opening in communication with the acoustic volume; a microphone configured to face toward the second direction; a first port substantially aligned with the vent opening; a second port substantially aligned with the microphone; and an acoustic impedance member extending over the first port and the second port.

Example 17: The device of any one of the preceding Examples, wherein the acoustic impedance member comprises an acoustic mesh.

Example 18: The device of any one of the preceding Examples, wherein the acoustic impedance member has a substantially uniform acoustic impedance.

Example 19: The device of any one of the preceding Examples, further comprising a support member at least partially surrounding the speaker, wherein the first port and the second port are each formed in the support member.

Example 20: The device of any one of the preceding Examples, wherein the second port has an opening size that is at least 50% of an opening size of the first port.

The invention claimed is:

1. A playback device comprising:

an earpiece configured to be positioned adjacent a user's ear, the earpiece comprising:

a transducer having a diaphragm configured to face toward the user's ear when the earpiece is positioned adjacent the user's ear;

an outlet vent in fluid communication with the transducer;

a first microphone and a second microphone;

a support member having a first opening aligned with a first microphone, a second opening aligned with the outlet vent, and a third opening aligned with the second microphone; and an acoustic mesh extending over the first opening, the second opening, and the third opening, wherein the mesh has a substantially uniform acoustic impedance of about 30-150 $Rayls_{MKS}$, wherein the first opening and the second opening have corresponding first and second areas, wherein the transducer has a downstream acoustic impedance based on the second area and the acoustic impedance of the mesh, and wherein the first microphone has an upstream acoustic impedance based on the first area and the acoustic impedance of the acoustic mesh.

2. The playback device of claim 1, wherein the support member comprises a first semi-annular member, and wherein the mesh comprises a second semi-annular member positioned over the first semi-annular member.

3. The playback device of claim 1, wherein an area of the second opening is at least 50% greater than an area of the first opening.

4. The playback device of claim 1, wherein the microphone is configured to detect voice input from the user.

5. An earpiece assembly for a playback device, the assembly comprising:

an audio transducer;

a housing containing the audio transducer, the housing defining an acoustic volume;

an aperture in fluid communication with the acoustic volume;

a first microphone and a second microphone;

a support member disposed adjacent to the audio transducer, the support member comprising a first port substantially aligned with the first microphone, a second port disposed substantially aligned with the aperture, and a third port substantially aligned with the second microphone; and an acoustic filter material covering the first port and the second port, wherein the acoustic filter material has an acoustic impedance of about 30-150 $Rayls_{MKS}$, wherein the first port and the second port have corresponding first and second areas, wherein the audio transducer has a downstream acoustic impedance based on the second area and an acoustic impedance of the acoustic filter material, and wherein the microphone has an upstream acoustic impedance based on the first area and the acoustic impedance of the acoustic filter material.

6. The earpiece assembly of claim 5, wherein the support member comprises a first semi-annular member, and wherein the acoustic filter material comprises a second semi-annular member positioned over the first semi-annular member.

7. The earpiece assembly of claim 5, wherein the first port has an opening size that is less than twice an opening size of the second port.

8. The earpiece assembly of claim 5, wherein the acoustic filter material comprises an acoustic mesh.

9. The earpiece assembly of claim 5, wherein the acoustic filter material has a substantially uniform acoustic impedance.

10. A portable playback device comprising:

an audio transducer;

an enclosure defining an acoustic volume adjacent the transducer;

a vent opening in communication with the acoustic volume;

a first microphone and a second microphone;

a first port substantially aligned with the vent opening, the first port having a first area;

a second port substantially aligned with the microphone, the second port having a second area;

a third port substantially aligned with the microphone; and an acoustic impedance member extending over the first port, the second port, and the third port, wherein the acoustic impedance member has an acoustic impedance of about 30-150 $Rayls_{MKS}$, wherein the audio transducer has a downstream acoustic impedance based on the first area and an acoustic impedance of the acoustic impedance member, and wherein the microphone has an upstream acoustic impedance based on the second area and the acoustic impedance of the acoustic impedance member.

11. The portable playback device of claim 10, wherein the playback device comprises a wearable playback device.

12. The portable playback device of claim 10, wherein the first port has an opening size that is less than twice an opening size of the second port.

13. The portable playback device of claim 10, wherein the acoustic impedance member has a substantially uniform acoustic impedance.

* * * * *